United States Patent [19]

Sakimoto et al.

[11] 4,263,193

[45] Apr. 21, 1981

[54] AQUEOUS EMULSION OF MULTI-COMPONENT SYNETHETIC RESIN AND PROCESS FOR PRODUCTION THEREOF

[75] Inventors: Seiichiro Sakimoto, Chigasaki; Yoshiaki Yoshioka, Yokohama, both of Japan

[73] Assignee: Showa Denko K.K., Japan

[21] Appl. No.: 76,803

[22] Filed: Sep. 17, 1979

[30] Foreign Application Priority Data

Mar. 17, 1978 [JP] Japan ................................ 53-29839

[51] Int. Cl.³ .............................................. C08L 23/04
[52] U.S. Cl. ....................... 260/29.6 RB; 260/29.6 T; 525/80; 525/311
[58] Field of Search ................... 260/29.6 RB, 29.6 T; 525/80, 311

[56] References Cited

U.S. PATENT DOCUMENTS

| | | | |
|---|---|---|---|
| 3,855,353 | 12/1974 | Alberts et al. | 525/311 |
| 3,937,760 | 2/1976 | Cole et al. | 525/311 |
| 3,974,119 | 8/1976 | Teer et al. | 260/29.6 RB |

FOREIGN PATENT DOCUMENTS 51-125167 11/1976 Japan .

OTHER PUBLICATIONS

Flory, P. J., Principles of Polymer Chemistry, Connell Uni. Press, 1953, pp. 187–189.

*Primary Examiner*—Hosea E. Taylor
*Assistant Examiner*—Amelia B. Yarbrough
*Attorney, Agent, or Firm*—Wenderoth, Lind & Ponack

[57] ABSTRACT

An aqueous emulsion of a multi-component synthetic resin capable of forming a film having superior properties is obtained by emulsion-polymerizing ethylene and styrene in a first step, and emulsion-polymerizing ethylene and a vinyl ester in a second step in the presence of the aqueous emulsion obtained in the first step.

8 Claims, No Drawings

AQUEOUS EMULSION OF MULTI-COMPONENT SYNETHETIC RESIN AND PROCESS FOR PRODUCTION THEREOF

This invention relates to an aqueous emulsion of a multicomponent synthetic resin capable of forming a film having improved properties, and to a process for preparation thereof.

The aqueous emulsion of a multicomponent synthetic resin of this invention contains 10 to 60% by weight of solids obtained by the polymerization of (A) 1 to 50% by weight of ethylene, (B) 4 to 95% by weight of a styrene monomer or a mixture of a styrene monomer and a monomer copolymerizable therewith, and (C) 4 to 95% by weight of a vinyl ester or a mixture of a vinyl ester and a monomer copolymerizable therewith. The important feature of this aqueous emulsion is that it is prepared by a process which comprises a first step of emulsion-polymerizing ethylene and a styrene monomer or ethylene and a mixture of a styrene monomer and a monomer copolymerizable therewith to form an aqueous emulsion, and a second step of emulsion-polymerizing ethylene and a vinyl ester, or ethylene and a mixture of a vinyl ester and a monomer copolymerizable therewith in the presence of the aqueous emulsion prepared in the first step.

The aqueous emulsion of this invention obtained by the above process forms a film having a relatively high hardness despite its relatively low MFT (minimum film-forming temperature). The film produced has good transparency, flexibility, water resistance, alkali resistance and weatherability and high break strength.

Many aqueous emulsions based on a copolymer of ethylene and a vinyl ester have previously been known. For example, an aqueous emulsion of a copolymer of ethylene and a vinyl ester, especially vinyl acetate, having an ethylene content of up to 40% by weight has a good pigment binding power, and a film prepared from this aqueous emulsion has good flexibility and a high sticking power. Accordingly, this emulsion is widely used as paints, adhesives, paper-treating agents, etc. However, the film, on the other hand, has the disadvantage that it is soft and its surface is susceptible to soiling, and moreover, the film has a low tensile strength and a relatively poor water resistance.

In an attempt to improve water resistance and saponification resistance, an aqueous emulsion of a terpolymer of ethylene/vinyl acetate/vinyl chloride was suggested. Films obtained from this emulsion have a yellowing tendency and poor weatherability. An aqueous emulsion of a four-component copolymer of ethylene/vinyl acetate/vinyl chloride/methacrylate ester was also suggested. However, films obtained from this aqueous emulsion still have a yellowing tendency.

A method for preparing an aqueous emulsion was also suggested (Japanese Laid-Open Patent Publication No. 125167/76) which comprises preparing an aqueous emulsion of an ethylene/vinyl acetate copolymer, or an aqueous emulsion of a terpolymer of ethylene/vinyl acetate/vinyl chloride in a first step, adding at least one ethylenically unsaturated compound such as styrene to the emulsion, and emulsion-polymerizing the unsaturated compound in the presence of an oil-soluble radical polymerization initiator. In commercial practice, any method which involves adding a styrene monomer in a later step for polymerization encounters with much difficulty. For example, it is difficult to polymerize all the styrene added in a later step in the reaction system, and after withdrawing the product, a small amount of the styrene monomer inevitably remains in the reactor. Fresh copolymerization of ethylene in the first step with vinyl acetate cannot be smoothly carried out in a reactor in which a small amount of the styrene monomer remains. It is well known that vinyl acetate has an undesirable copolymerization parameter with regard to styrene, and a small amount of styrene monomer acts as a retarder for inhibiting the polymerization of vinyl acetate (see, for example, Paul J. Flory: Principles of Polymer Chemistry, pages 187–189). Furthermore, a film prepared from the aqueous emulsion obtained by such a method has inferior transparency, water resistance, alkali resistance and break strength to a film prepared from the aqueous emulsion of this invention.

In contrast, according to this invention, an aqueous emulsion containing a styrene component in the solids can be easily produced without the aforesaid difficulties in the polymerization process, and the resulting aqueous emulsion has superior properties.

Preferred embodiments of this invention are described in detail below.

The styrene monomer used as component (B) in this invention includes styrene and styrene derivatives such as alpha-methylstyrene, 2-chlorostyrene, 4-chlorostyrene, 2,5-dichlorostyrene and 4-methoxystyrene. Styrene is preferred. The styrene monomer (B) contributes mainly to the water resistance and hardness of a film prepared from the aqueous emulsion of this invention.

Examples of a monomer copolymerizable with the styrene monomer which is used together with the styrene monomer as required include acrylates and methacrylates [to be abbreviated "(meth)acrylates" hereinbelow] such as methyl (meth)acrylates, ethyl (meth)acrylates, propyl (meth)acrylates, butyl (meth)-acrylates, and 2-ethylhexyl (meth)acrylates, unsaturated acids such as acrylic acid and methacrylic acid, maleic acid and its esters, (meth)acrylonitriles, (meth)acrylamides, vinylpyridine, and vinylpyrrolidone. The amount of the other copolymerizable monomer is up to 3 times, preferably up to 2 times, the weight of the styrene monomer.

Moreover, a polyolefinically unsaturated comonomer, such as ethylene glycol di(meth)acrylate, butanediol di(meth)acrylate, allyl (meth)acrylate or divinylbenzene, may be used in an amount of up to 10% by weight based on the total amount of component (B).

The vinyl ester used as component (C) is a vinyl ester of a linear or branched carboxylic acid having 1 to 25 carbon atoms, preferably 2 to 20 carbon atoms, and includes, for example, vinyl acetate, vinyl propionate, vinyl butyrate, vinyl valerate, vinyl 2-ethylhexylate, vinyl isononanate, vinyl laurate, vinyl stearate, vinyl versatate, and mixtures thereof.

Examples of a monomer copolymerizable with the vinyl ester include vinyl halides such as vinyl chloride and vinyl bromide, acrylic esters, fumaric esters, crotonic acid and its derivatives. The amount of such a comonomer is up to 3 times, preferably up to 2 times, the weight of the vinyl ester.

The solids concentration of the aqueous emulsion of this invention is 10 to 60% by weight, preferably 30 to 55% by weight, and the solids consist of particles of a polymer or copolymer or a mixture thereof resulting from the polymerization or copolymerization of the following components: (A) 1 to 50% by weight, preferably 1 to 30% by weight, (B) 4 to 95% by weight, preferably 10 to 80% by weight, most preferably 10 to 60% by weight, and (C) 4 to 95% by weight, preferably 10 to 90% by weight. The aqueous emulsion has a logarithmic viscosity, determined in benzene at 30° C., of 0.1 to 1.5, preferably 0.2 to 1.

When the proportions of the individual components are outside the ranges specified above, the properties of films prepared from the aqueous emulsion are affected in various ways. When the proportion of component (A) is less than 1%, the plasticity of the film is insufficient, and when it exceeds 50%, the film becomes too soft. When the proportion of component (B) is less than 4%, the water resistance and hardness of the film are insufficient, and when it exceeds 95%, the film is too hard, and is brittle. When the proportion of component (C) is less than 4%, adhesiveness does not easily develop, and when it exceeds 95% by weight, the film becomes brittle or has reduced alkali resistance. By properly varying the proportions of the individual components within the above-specified ranges, it is possible to produce films having various properties ranging from those which are soft and have a high elongation to those which have moderate elongation and high strength, and from those which have high tackiness to those which do not show tackiness. The films produced are flexible and have good transparency and excellent water resistance, alkali resistance and weatherability.

Additives such as pigments, plasticizers, antiseptics and defoamers can be mixed with the multicomponent synthetic resin emulsion of this invention. The emulsion of this invention is useful for coating, painting, bonding, paper treating, textile treatment, etc., and also as additives for cement and mortar. The multicomponent synthetic resin isolated from the aqueous emulsion of the multicomponent synthetic resin of this invention is useful as a hot-melt substrate or a blending material for synthetic resins such as polyolefins. Referential Examples 1 to 5 to be given hereinbelow show some examples of application which show the superiority of the aqueous emulsion of this invention.

A process for producing the aqueous emulsion of the present invention is described below. The process is characterized by comprising a first step of emulsion-polymerizing ethylene and (B) a styrene monomer or a mixture of a styrene monomer and a monomer copolymerizable therewith to prepare an aqueous emulsion substantially free from the monomer (B), and a second step of emulsion-polymerizing ethylene and (C) a vinyl ester or a mixture of a vinyl ester and a monomer copolymerizable therewith in the presence of the aqueous emulsion formed in the first step. For the simplicity of description, the above process is described in detail below taking up styrene as monomer (B) and vinyl acetate as monomer (C).

Usually, in the first step polymerization, all styrene to be used is charged into a reactor containing an aqueous medium containing a dispersant, and ethylene under pressure is reacted with the styrene. If desired, a part of the styrene may be charged at the start, and the remainder, added portionwise as the polymerization proceeds. Alternatively, a part of a dispersant is added to the reactor, and then a solution of another part of the dispersant in styrene is added. Or a mixture of water, a dispersant and styrene is emulsified, and then added to the reactor.

It is important in the first-step polymerization that styrene used is fully polymerized in the presence of ethylene until there is substantially no unreacted styrene monomer in the reaction system. If the styrene monomer remains, polymerization of vinyl acetate and ethylene in the second step is inhibited. In the emulsion polymerization of styrene and ethylene in the first step, the reaction proceeds while the main reaction is first the polymerization styrene, then the copolymerization of styrene and ethylene, and finally the polymerization of ethylene. Thus, the remaining of the styrene monomer can be easily avoided. It has been confirmed that even when a trace amount, such as about 300 ppm, of styrene monomer remains in the aqueous emulsion formed in the first step, the polymerization in the second step is performed without any trouble. Thus, the substantial freedom from the styrene monomer means that it does not remain in an amount of more than about 300 ppm.

Desirably, the first step polymerization is carried out so that the solids content of the resulting aqueous emulsion becomes 5 to 60% by weight, preferably 5 to 40% by weight. When its solids content is high, the second-stage polymerization is carried out after diluting the emulsion with water, and finally an aqueous emulsion having a solids content of 10 to 60% by weight is prepared.

Polymerization of vinyl acetate and ethylene in the second step is carried out in the presence of the aqueous emulsion obtained in the first step. According to this invention, the second step polymerization is carried out subsequent to the polymerization in the first step. Specifically, vinyl acetate and if desired, an additional amount of ethylene may be introduced into the reactor containing the aqueous emulsion formed in the first step and the pressurized unreacted ethylene monomer, and then the second step polymerization can be carried out. Needless to say, the second step polymerization may be performed in the presence of the aqueous emulsion of the first step which is separately prepared.

The ratio between the amount of ethylene polymerized in the first step and that of ethylene polymerized in the second step is not particularly limited. It is sufficient that the total amount of ethylenes in these steps is adjusted to the desired value, i.e. 1 to 50% by weight in the solids. Usually, introduction of vinyl acetate is carried out sucessively in the presence of of ethylene under pressure. However, no particular limitation is imposed on it.

The polymerization in the second step proceeds easily and very smoothly as does the first step polymerization. Finally, an aqueous emulsion is obtained which contains polymerized particles having an average size of 0.01 to 2 microns of the individual components in the proportions specified hereinabove.

The polymerization temperature is from 0° to 100° C., preferably 20° to 90° C., and the polymerization pressure is from 5 to 200 kg/cm$^2$, preferably 10 to 100 kg/cm$^2$. The pressure is provided mainly by pressurized starting ethylene. In the first and second steps, the temperature and pressure may be the same or different within the above ranges.

Emulsion polymerization in this invention is carried out in a customary manner. In the second step of the two-step polymerization in accordance with this invention, the monomers added in the presence of the aqueous emulsion obtained in the first step are successively seed-polymerized on the particles of the aqueous emulsion obtained in the first step. Catalysts, dispersants, emulsifying agents and protective colloids that can be used in emulsion polymerization are described below.

Radical-initiating catalysts are conveniently used as polymerization catalysts. Examples of such polymerization catalysts include potassium persulfate, ammonium persulfate, tertiary butyl hydroperoxide, azobis-(2-amidinopropane) hydrochloride, lauroyl peroxide, persuccinic butyl peroxide, ketone hydroperoxide, α,α'-azobisisobutyric acid esters, and α,α'-azobisisobutyronitrile. These catalysts can be used singly or as "redox catalysts" in combination with suitable reducing agents. Examples of suitable reducing agents are amines, ferrous salts, sodium thiosulfate, sodium sulfite, sodium hyposulfite, and formaldehyde sodium sulfoxylate. The suitable amount of the catalyst and optionally the reducing agent is 0.01 to 20% by weight based on the total weight of the monomers. The catalyst may be added at a time at the beginning of polymerization. Or a part of it may be added at the beginning, and the remainer may be added as the polymerization proceeds.

Emulsifiers, or protective colloids, or both which are normally used in emulsion polymerization can be used as dispersants.

Examples of emulsifiers include anionic surfactants, nonionic surfactants and cationic surfactants. Examples of the anionic surfactants include alkyl sulfates, alkylaryl sulfates, sulfates of hydroxyalkanols, sulfosuccinic esters, and sulfates and phosphates of alkyl- or alkylarylpolyethoxyalkanols. Specific examples of the nonionic surface active agents include polyoxyethylene alkyl ethers, polyoxyethylenealkyl phenol esters, polyoxyethylene fatty acid esters, sorbitan fatty acid esters, polyoxyethylene sorbitan fatty acid esters, addition products between 5 to 50 moles of ethylene oxide and linear or branched carboxylic acid amides containing 6 to 22 carbon atoms, and a block copolymer of propylene oxide and ethylene oxide.

Specific examples of the cationic surface active agents include alkylamine salts, quaternary ammonium salts, and polyoxyethylene alkylamines. A combination of a nonionic surface active agent with an anionic surface-active agent or cationic surface-active agent is also possible.

The amount of the surface-active agent is 0.1 to 40% by weight based on the total weight of the monomer in the first step.

Protective colloids include, for example, polyvinyl alcohols such as polyvinyl alcohol, partially acetylated polyvinyl alcohol or a partial or complete saponification product of a copolymer of vinyl acetate and a (meth)acrylate ester, water-soluble cellulose derivatives such as hydroxyethyl cellulose, hydroxypropyl cellulose, methyl cellulose or carboxymethyl cellulose, water-soluble starch, a water-soluble copolymer (meth-)acrylic acid and an amide, a copolymer of styrene and maleic acid, a copolymer of styrene and maleinimide, and a poly-N-vinyl compound of an open-chain or cyclic carboxylic acid amide. The amount of the protective colloid is at most 20% by weight based on the total weight of the monomers in the first step.

During the polymerization, the pH of the reaction mixture is maintained at 2 to 8, preferably 3 to 5. If required for pH adjustment, a buffer may be used. Examples of the buffer are acids such as formic acid, acetic acid, hydrochloric acid and sulfuric acid, bases such as ammonia, amines, sodium hydroxide, potassium hydroxide, and calcium hydroxide, alkali carbonates, phosphate salts, and acetic acetate salts. If required, mercaptan, aldehydes, chlorinated hydrocarbons, etc. may be added as molecular weight regulating agents.

The following examples illustrate the present invention further. The various properties shown in the examples were measured by the following methods.

(a) Tensile strength and elongation

An emulsion having a solids content of 25% by weight is poured onto a framed polyethylene plate having a predetermined area, and dried in the air at room temperature for at least 48 hours, and further dried in vacuum at room temperature for at least 24 hours until its weight became constant. Thus, a film sample having a thickness of 0.25±0.03 mm was used. A dumbbell-shaped specimen having a width of 20 mm was prepared from the film sample, and its strength and elongation were determined in accordance with JIS Z-1702 using a tensile tester (Toyo-Baldwin Tensilon UTM-III-100).

(b) Alkali resistance

A 5×5 cm specimen was cut out from the film having a thickness of 0.25±0.03 mm and dried to a constant weight in (a) above. The specimen was dipped for 4 days in a 25% aqueous solution of sodium hydroxide, then dipped for 1 day in distilled water, then withdrawn from the distilled water, and dried until its weight became constant. The loss of weight was expressed as percentage of the weight of the film, and defined as the alkali resistance of the film.

(c) Water resistance

The 5×5 cm film specimen described in (b) was dipped for 24 hours in distilled water, and water adhering to its surface was wiped off with a paper towel. Then, the film was weighed, and the increase of weight is defined as water resistance (%).

(d) Logarithmic viscosity

The logarithmic viscosity was determined on a benzene solution having a polymer concentration of 0.4 g/dl at 30° C. using a Cannon-Fenske viscometer. The logarithmic viscosity was calculated from the following equation.

$$\text{Logarithmic viscosity} = \log \eta_r/c$$

wherein $\eta_r$ is the viscosity ratio, and c is the concentration (g/dl) of the polymer.

EXAMPLE 1

A 1-liter stainless steel autoclave equipped with an anchor-type stirrer was charged with the following ingredients.

| | |
|---|---|
| Distilled water | 298 g |
| Emulgen E-950 (*) | 9.6 g |
| Emal O (**) | 2.4 g |
| Sodium pyrophosphate | 2.0 g |
| Ammonium persulfate | 2.0 g |
| Styrene | 86 g |

(*): Polyoxyethylene nonyl phenol ether (a nonionic surfactant, made by Kao-Atlas Co., Ltd.).
(**): Sodium laurylsulfate (an anionic surfactant, made by Kao-Atlas Co., Ltd.).

Then, the air inside the autoclave was sufficiently replaced by nitrogen and ethylene, with stirring the polymerization temperature was raised to 70° C., and the pressure of ethylene was increased to 45 kg/cm². In this state, the first step polymerization was performed for 3.5 hours. Subsequently, 200 g of vinyl acetate was added over the course of 2 hours, and the second step polymerization was continued. Since ethylene was not additionally supplied during this time, the pressure of ethylene decreased from 45 kg/cm² to 32 kg/cm². When the polymerization was continued for 1.5 hours, the pressure of ethylene further decreased to 26 kg/cm². The autoclave was then allowed to cool, and the produce was taken out. The resulting aqueous emulsion of a multicomponent synthetic resin was a stable blue white emulsion having an average particle diameter of less than 0.1 micron and a solids content of 49.57% by weight.

A bluish film having flexibility at room temperature and good transparency was obtained from the aqueous emulsion of synthetic resin. The film contained 3.30% by weight of ethylene, 65.65% by weight of vinyl acetate; 31.06% by weight of styrene, and had the following characteristics

| Alkali resistance | 1.77% |
|---|---|
| Water resistance | 19.45% |
| Break strength | 47.61 kg/cm² |
| Elongation | 540% |
| Logarithmic viscosity | 0.46 |

COMPARATIVE EXAMPLE 1

The same autoclave as used in Example 1 was charged with the same ingredients as used in Example 1. Subsequently, the air inside the autoclave was fully replaced by nitrogen, and with stirring under a nitrogen pressure of 54 kg/cm², the first step polymerization was performed at 70° C. for 3.5 hours. After the end of the first-step polymerization, nitrogen was released. Subsequently, 32 kg/cm² of ethylene was fed, and 200 g of vinyl acetate was added over the course of 2 hours to perform the second step polymerization. Since no additional ethylene was supplied during this time, the pressure of ethylene decreased from 32 kg/cm² to 29 kg/cm². In this state, the polymerization was continued for 1.5 hours.

After allowing the autoclave to cool, the product was withdrawn. The product was an emulsion having a strong smell of vinyl acetate and had a solids concentration of 18.09% by weight. The solid portion of the emulsion was a homopolymer of styrene. Vinyl acetate and ethylene did not polymerize at all, but dissolved in the aqueous emulsion as monomers.

COMPARATIVE EXAMPLE 2

The same autoclave as used in Example 1 was charged with the following ingredients.

| Distilled water | 298 g |
|---|---|
| Emulgen E-950 | 9.6 g |
| Emal O | 2.4 g |
| Sodium pyrophosphate | 2.0 g |
| Ammonium persulfate | 2.0 g |

Subsequently, the air inside the autoclave was fully replaced by nitrogen and ethylene. With stirring, the polymerization temperature was raised to 70° C., and the pressure of ethylene was raised to 45 kg/cm². A monomeric mixture consisting of 200 g of vinyl acetate and 86 g of styrene was added over the course of 5.5 hours. During this time, ethylene was not additionally supplied. After adding the monomeric mixture, the polymerization was continued for 1.5 hours in this state. The autoclave was allowed to cool, and the product was taken out. The product was an emulsion having a strong odor of vinyl acetate and containing 19.24% by weight of solids. The solids were a homopolymer of styrene, and vinyl acetate and styrene were not polymerized at all.

EXAMPLE 2

The same autoclave as used in Example 1 was charged with the following ingredients.

| Distilled water | 540 g |
|---|---|
| Blenmer PE-350 (***) | 1.5 g |
| Emulgen E-950 | 9.6 g |
| Sodium pyrophosphate | 3.0 g |
| Ammonium persulfate | 3.0 g |
| Styrene | 28.5 g |

(***): Polyethylene glycol monomethacrylate (a product of Nippon Yushi Co., Ltd.)

Subsequently, the air inside the autoclave was replaced by nitrogen and ethylene. With stirring, the polymerization temperature was adjusted to 70° C., and the pressure of ethylene was increased to 50 kg/cm². In this state, the first-step polymerization was performed for 3.5 hours. Subsequently, 210 g of vinyl acetate was added over the course of 2 hours, and the second-step polymerization was performed. During this time, ethylene was not additionally supplied, and therefore, the pressure of ethylene decreased from 50 kg/cm² to 30.5 kg/cm². After the addition of vinyl chloride, the polymerization was continued at 70° C. for 1 hour. The pressure of ethylene became 22.5 kg/cm².

The properties of the resulting aqueous emulsion of synthetic resin and a film prepared from it are shown in Table 1.

EXAMPLE 3

Two-step polymerization was performed under the same conditions as in Example 2 except that in the first step, the amount of styrene was changed to 57.0 g and the amount of Blenmer PE-350 was changed to 3.0 g. The properties of the resulting aqueous emulsion of synthetic resin and a film prepared from it are shown in Table 1.

EXAMPLE 4

Two-step polymerization was performed under the same conditions as in Example 2 except that in the first step, the amount of styrene was changed to 85.5 g and the amount of Blenmer PE-350 was changed to 4.5 g.

The properties of the aqueous emulsion of synthetic resin and a film prepared from it are shown in Table 1.

EXAMPLE 5

Two-step polymerization reaction was performed under the same conditions as in Example 2 except that in the first step, the amount of styrene was changed to 114.0 g, and the amount of Blenmer PE-350 was changed to 6.0 g. The properties of the aqueous emulsion of synthetic resin and a film prepared from it are shown in Table 1.

COMPARATIVE EXAMPLE 3

The same autoclave as used in Example 1 was charged with the following ingredients.

| Distilled water | 298 g |
|---|---|
| Emulgen E-950 | 9.6 g |
| Emal o | 2.4 g |
| Sodium pyrophosphate | 1.2 g |
| Ammonium persulfate | 0.9 g |

Subsequently, the air inside the autoclave was replaced by nitrogen and ethylene. With stirring, the temperature was adjusted to 70° C., and then ethylene was introduced and pressurized to 50 kg/cm². Then, 286 g of vinyl acetate was added over the course of 3 hours to perform copolymerization. During this time, the pressure of ethylene was maintained at 50 kg/cm². After the addition of vinyl acetate, the polymerization temperature was raised to 80° C., and the polymerization was performed for 1 hour. The autoclave was allowed to cool, and the unreacted ethylene was released. The reaction product was withdrawn. The properties of the resulting aqueous emulsion of ethylene/vinyl acetate copolymer and a film prepared from it are shown in Table 1.

TABLE 1

|  | Example 2 | Example 3 | Example 4 | Example 5 | Comparative Example 3 |
|---|---|---|---|---|---|
| Properties of emulsion | | | | | |
| Solids concentration (wt. %) | 33.73 | 36.17 | 38.05 | 39.21 | 49.23 |
| pH | 4.70 | 4.60 | 4.75 | 4.70 | 4.70 |
| Particle diameter (microns) | below 0.1 | below 0.1 | below 0.1 | below 0.1 | 0.38 |
| Logarithmic viscosity | 0.498 | 0.465 | 0.448 | 0.447 | 0.411 |
| Properties of film | | | | | |
| Ethylene content (wt. %) | 14.76 | 14.07 | 12.05 | 9.58 | 17.25 |
| Vinyl acetate content (wt. %) | 73.20 | 66.10 | 60.51 | 55.51 | 82.70 |
| Styrene content (wt. %) | 11.44 | 18.84 | 26.07 | 33.16 | — |
| Water resistance (%) | 22.14 | 20.29 | 18.53 | 15.69 | 33.80 |
| Alkali resistance (%) | 6.53 | 4.80 | 4.28 | 7.19 | 12.20 |
| Break strength (kg/cm²) | 6.01 | 9.71 | 19.16 | 42.12 | 2.04 |
| Elongation (%) | >1400 | >1400 | 1303 | 688 | >1400 |

EXAMPLE 6

The same autoclave as used in Example 1 was charged with the following ingredients.

| Distilled water | 297.8 g |
|---|---|
| Polyvinyl alcohol (Kuraray Poval 217) | 1.2 g |
| Emulgen E-950 | 9.6 g |
| Emal O | 2.4 g |
| Sodium pyrophosphate | 2.0 g |
| Ammonium persulfate | 2.0 g |
| Styrene | 86 g |

Subsequently, the air inside the autoclave was replaced by nitrogen and ethylene. With stirring, the polymerization temperature was adjusted to 70° C., and the pressure of ethylene was increased to 45 kg/cm². In this state, the first step polymerization was performed for 2 hours. Subsequently, 200 g of vinyl acetate was added over the course of 2 hours, and the second-step polymerization was performed. During this time, ethylene was not additionally supplied, and therefore, the pressure of ethylene decreased from 45 kg/cm² to 34 kg/cm². In this state, the polymerization was continued for 2 hours. Then, the autoclave was allowed to cool, and the product was withdrawn. The properties of the resulting aqueous emulsion of synthetic resin and a film prepared from it are shown in Table 2.

EXAMPLE 7

Two-step polymerization was carried out under the same conditions as in Example 6 except that 3 g of hydroxyethyl cellulose (Al-15) was used instead of the polyvinyl alcohol. The properties of the resulting synthetic resin emulsion and a film prepared from it are shown in Table 2.

COMPARATIVE EXAMPLE 4

The same autoclave as used in Example 1 was charged with the following ingredients.

| Distilled water | 307.5 g |
|---|---|
| Hydroxyethyl cellulose (AL-15) | 3.5 g |
| Emulgen E-950 | 9.6 g |
| Emal O | 9.6 g |
| Sodium pyrophosphate | 1.2 g |
| Ammonium persulfate | 0.6 g |

Subsequently, the air inside the autoclave was replaced by nitrogen and ethylene. With stirring, the polymerization temperature was adjusted to 70° C., and the pressure of ethylene was maintained at 35 kg/cm². Then, 300 g of vinyl acetate was added over the course of 3 hours, and copolymerized with ethylene. During this time, the pressure of ethylene was maintained at 35 kg/cm². After the addition, the polymerization temperature was raised to 80° C., and the polymerization was performed further for 1 hour. The autoclave was allowed to cool, and ethylene was released. Then, the product was withdrawn. The properties of the resulting ethylene/vinyl acetate copolymer emulsion and a film prepared from it are shown in Table 2.

COMPARATIVE EXAMPLE 5

A 500 ml four-necked flask equipped with a thermometer, a stirrer, a nitrogen introducing inlet, a reflux condenser and a dropping funnel was charged with the following ingredients.

| Ethylene/vinyl acetate copolymer obtained in Comparative Example 4 (the solids concentration was adjusted to 44.5% by weight using water) | 100 g |
|---|---|
| Na₂SO₃ . 7H₂O | 0.25 g |
| Distilled water | 13.7 g |

The air inside the flask was replaced by nitrogen, and while flowing nitrogen slowly, the flask was heated with stirring. When the temperature of the inside reached 60° C., 22.3 g of styrene containing 0.12 g of benzoyl peroxide was added dropwise for 1 hour. During this time, the polymerization temperature was maintained at 60° C. After the addition, the polymerization was continued at 60° C. for 1 hour and 20 minutes.

The resulting emulsion gave off a slight smell of styrene, and a film prepared from the emulsion was white and completely opaque. The other properties of the emulsion and film are shown in Table 2.

COMPARATIVE EXAMPLE 6

The same autoclave as used in Example 1 was charged with the following ingredients.

| | |
|---|---|
| Distilled water | 307.5 g |
| Hydroxyethyl cellulose (AL-15) | 3.5 g |
| Emulgen E-950 | 9.6 g |
| Emal O | 9.6 g |
| Sodium pyrophosphate | 1.2 g |
| Ammonium persulfate | 0.6 g |

Subsequently, the air inside the autoclave was replaced by nitrogen and ethylene. With stirring, the polymerization temperature was adjusted to 70° C., and the pressure of ethylene, to 35 kg/cm². Vinyl acetate (255 g) was added over the period of 2.5 hours, and copolymerized with ethylene. After the addition of vinyl acetate, 45 g of methyl methacrylate (MMA) was added over the course of 30 minutes, and polymerized. During this time, the pressure of ethylene was maintained at 35kg/cm². After the addition, the polymerization temperature was raised to 80° C., and the polymerization was performed further for 1 hour. The autoclave was allowed to cool, and ethylene was released. The reaction product was withdrawn. The resulting emulsion gave off a strong odor of unreacted methyl methacrylate. The properties of the resulting emulsion and a film prepared from it are shown in Table 2.

EXAMPLE 8

Two-step polymerization was carried out under the same conditions as in Example 1 except that in the first step, a monomeric mixture of 43 g of styrene and 43 g of methyl methacrylate was used instead of 86 g of styrene. The properties of the resulting aqueous emulsion of synthetic resin and a film prepared from it are shown in Table 2.

EXAMPLE 9

Two-step polymerization reaction was performed under the same conditions as in Example 1 except that a monomeric mixture consisting of 77.4 g of styrene and 8.6 g of acrylonitrile (AN) was used instead of 86 g of styrene. The properties of the resulting aqueous emulsion of synthetic resin and a film prepared from it are shown in Table 2.

EXAMPLE 10

The same autoclave as used in Example 1 was charged with the following ingredients.

| | |
|---|---|
| Distilled water | 540 g |
| Emulgen E-950 | 9.6 g |
| Sodium pyrophosphate | 3.0 g |
| Ammonium persulfate | 3.0 g |
| Styrene | 30 g |

Subsequently, the air inside the autoclave was replaced fully by nitrogen and ethylene. With stirring, the polymerization temperature was raised to 70° C., and the pressure of ethylene was increased to 76 kg/cm². In this state, the first-step polymerization was carried out for 3.5 hours. Then, the autoclave was allowed to cool, and ethylene was released. The product was taken out. The resulting aqueous emulsion of synthetic resin was a stable emulsion having an average particle diameter of less than 0.1 micron and a solids content of 8.10% by weight and being free from a smell of styrene. However, when this aqueous emulsion was dried at room temperature, it became white semi-transparent broken pieces having an average area of about 5 mm², and no film was obtained. The solid portion consisted of 91.0% by weight of styrene and 9.0% by weight of ethylene.

As a second step, the following polymerization was performed. The autoclave used in the first step was charged with 100 g of distilled water. Subsequently, the air inside the autoclave was replaced fully by nitrogen and ethylene. With stirring, the polymerization temperature was raised to 70° C., and the pressure of ethylene was increased to 75 kg/cm². Then, 580 g of the styrene-/ethylene copolymer emulsion prepared in the first step, 210 g of vinyl acetate and 3.0 g of ammonium persulfate were vigorously stirred at room temperature under a stream of nitrogen to prepare a pre-emulsion. The pre-emulsion was added to the autoclave over the course of 2 hours, and polymerized. During this time, ethylene was not additionally supplied, and therefore, the pressure of ethylene decreased to 48 kg/cm². When the polymerization was continued for 1 hour after the addition of the pre-emulsion, the pressure of ethylene decreased further to 36 kg/cm². Then, the autoclave was allowed to cool, and the product was withdrawn. The properties of the resulting aqueous emulsion of synthetic resin and a film prepared from it are shown in Table 2.

EXAMPLE 11

Two-step polymerization was carried out under the same conditions as in Example 1 except that in the first step, 3.0 g of azobis(2-amidinopropane)hydrochloride was used instead of 2.0 g of ammonium persulfate, sodium pyrophosphate was not used, and the reaction temperature was maintained at 60° C. The properties of the resulting aqueous emulsion of synthetic resin and a film prepared from it are shown in Table 2.

TABLE 2

| | Ex. 6 | Ex. 7 | Comparative Ex. 4 | Comparative Ex. 5 | Comparative Ex. 6 | Ex. 8 | Ex. 9 | Ex. 10 | Ex. 11 |
|---|---|---|---|---|---|---|---|---|---|
| Properties of emulsion | | | | | | | | | |
| Solids concentration (wt. %) | 49.22 | 49.93 | 52.19 | 48.36 | 49.60 | 46.80 | 47.55 | 30.45 | 49.33 |
| pH | 4.30 | 4.70 | 4.70 | 4.70 | 4.62 | 4.30 | 4.05 | 4.12 | 3.12 |
| Particle diameter (microns) | below 0.1 | below 0.1 | 0.73 | 0.78 | 0.70 | below 0.1 | below 0.1 | below 0.1 | below 0.1 |
| Logarithmic viscosity | 0.489 | 0.551 | — | — | — | 0.505 | 0.582 | 0.476 | 0.633 |
| Properties of film | | | | | | | | | |
| Ethylene content (wt. %) | 4.30 | 4.15 | 14.30 | 13.18 | 12.30 | 10.26 | 3.26 | 15.23 | 5.30 |
| Vinyl acetate content (wt. %) | 63.92 | 64.71 | 85.70 | 54.62 | 76.30 | 61.62 | 63.80 | 72.70 | 63.60 |
| Styrene content (wt. %) | 31.79 | 31.14 | — | 32.20 | — | 14.03 | 29.28 | 12.07 | 31.02 |

TABLE 2-continued

|  | Ex. 6 | Ex. 7 | Comparative Ex. 4 | Comparative Ex. 5 | Comparative Ex. 6 | Ex. 8 | Ex. 9 | Ex. 10 | Ex. 11 |
| --- | --- | --- | --- | --- | --- | --- | --- | --- | --- |
| Content of monomer copolymerizable with styrene (wt. %) | — | — | — | — | 11.40 (MMA) | 14.09 (MMA) | 3.66 (AN) | — | — |
| Water resistance (%) | 8.85 | 19.88 | 30.60 | 27.84 | 47.50 | 23.44 | 19.13 | 25.65 | 18.86 |
| Alkali resistance (%) | 1.95 | 3.71 | 4.00 | 5.72 | 7.60 | 1.94 | 3.37 | 1.58 | 1.97 |
| Break strength (kg/cm$^2$) | 59.55 | 75.48 | 3.5 | 10.74 | 32.2 | 12.63 | 60.59 | — | — |
| Elongation (%) | 425 | 470 | >1400 | 775 | 700 | 1417 | 458 | — | — |

COMPARATIVE EXAMPLE 7

The same autoclave as used in Example 1 was charged with the following ingredients.

| Distilled water | 310 g |
| --- | --- |
| Emulgen E-950 | 9.6 g |
| Emal O | 2.4 g |
| Sodium pyrophosphate | 1.2 g |
| Ammonium persulfate | 0.9 g |

Subsequently, the air inside the autoclave was charged with nitrogen and ethylene. With stirring, the temperature of the inside of the autoclave was raised to 70° C., and ethylene was introduced. The pressure of ethylene was raised to 23 kg/cm$^2$. Then, 300 g of vinyl acetate containing 1.5 g of triallyl cyanurate was added over the course of 3 hours, and copolymerized. During this time, the pressure of ethylene was maintained at 23 kg/cm$^2$. After the addition, the polymerization temperature was raised to 80° C., and the polymerization was performed further for 1 hour. The autoclave was allowed to cool, and ethylene was released. The reaction product was withdrawn.

The properties of the resulting ethylene/vinyl acetate emulsion and a film prepared from it are shown below.

| Solids concentration | 48.20% by weight |
| --- | --- |
| pH | 3.35 |
| Particle diameter | 0.25 micron |
| Ethylene content | 8.44% by weight |
| Vinyl acetate content | 90.86 by weight |
| Water resistance | 33.34% |
| Alkali resistance | 6.0% |
| Break strength | 47.41 kg/cm$^2$ |
| Elongation | 475% |

Fifty grams of the resulting emulsion was mixed with 130 g of the ethylene/styrene copolymer emulsion obtained in the first step of Example 10 to form an emulsion mixture. A film prepared from the emulsion mixture was white and semitransparent, and had the following properties.

| Water resistance | 35.22% |
| --- | --- |
| Alkali resistance | 6.20% |
| Break strength | 34.65 kg/cm$^2$ |
| Elongation | 350% |

It is clearly seen from the above results that a mere blend does not improve water resistance and alkali resistance and caused a reduction both in break strength and elongation.

EXAMPLE 12

The same autoclave as used in Example 1 was charged with the following ingredients.

| Distilled water | 268 g |
| --- | --- |
| 10% Aqueous solution of hydroxyethyl cellulose (AL-15) | 30 g |
| Emulgen E-950 | 9.6 g |
| Emal O | 2.4 g |
| Sodium pyrophosphate | 2.0 g |
| Ammonium persulfate | 3.5 g |
| Styrene | 86 g |

Subsequently, the air inside the autoclave was replaced by nitrogen and ethylene. With stirring, the temperature of the inside of the autoclave was raised to 70° C., and the pressure of ethylene was increased to 80 kg/cm$^2$. In this state, the first-step polymerization was performed for 2.5 hours. A monomeric mixture consisting of 100 g of vinyl acetate and 100 g of vinyl chloride was added over the course of 6 hours in the second step, and polymerized. During this period, the pressure of ethylene was maintained at 80 kg/cm$^2$.

After the addition of the monomeric mixture, a fresh supply of ethylene was stopped, and the polymerization was performed for 8 hours. The autoclave was allowed to cool, and ethylene was released. The reaction product was withdrawn. The properties of the resulting aqueous emulsion of synthetic resin and a film prepared from it are shown below.

| Solids concentration | 48.65% by weight |
| --- | --- |
| pH | 3.80 |
| Particle diameter | below 0.1 micron |
| Ethylene content | 11.02% by weight |
| Vinyl acetate content | 28.22% by weight |
| Vinyl chloride content | 29.02% by weight |
| Styrene content | 31.06% by weight |
| Water resistance | 14.50% |
| Alkali resistance | 3.66% |
| Break strength | 79.72 kg/cm$^2$ |
| Elongation | 483% |

EXAMPLE 13

The same autoclave as used in Example 1 was charged with the following ingredients.

| Distilled water | 298 g |
| --- | --- |
| Emulgen E-950 | 9.6 g |
| Emal O | 2.4 g |
| Sodium pyrophosphate | 2.0 g |
| Ammonium persulfate | 2.0 g |
| Styrene | 43 g |
| Methyl methacrylate | 43 g |

Subsequently, the air inside the autoclave was fully replaced by nitrogen and ethylene. With stirring, the polymerization temperature was raised to 70° C., and the pressure of ethylene was raised to 80 kg/cm². In this state, the first-step polymerization was carried out for 2.5 hours.

Successively, as a second-step polymerization, a monomeric mixture consisting of 100 g of vinyl acetate and 100 g of vinyl chloride was added over the course of 6 hours, and polymerized. During this time, the pressure of ethylene was maintained at 80 kg/cm². After the addition of the monomeric mixture, a fresh supply of ethylene was stopped. and the polymerization was performed for 8 hours. After the polymerization, the autoclave was allowed to cool, and ethylene was released. The reaction product was withdrawn.

The properties of the aqueous emulsion of multi-component synthetic resin and a film prepared from it are as follows:

| | |
|---|---|
| Solids concentration | 49.22% by weight |
| pH | 3.80 |
| Particle diameter | below 0.1 micron |
| Ethylene content | 10.88% by weight |
| Vinyl acetate content | 28.53% by weight |
| Vinyl chloride content | 28.67% by weight |
| Styrene content | 14.40% by weight |
| MMA content | 15.03% by weight |
| Water resistance | 14.72% |
| Alkali resistance | 2.88% |
| Break strength | 70.33 kg/cm² |
| Elongation | 522% |

The following Referential Examples show some examples of use of the aqueous emulsion of this invention.

REFERENTIAL EXAMPLE 1

A water-base paint vehicle of the following formulation was prepared using the aqueous emulsion of multi-component synthetic resin obtained in Example 1.

| Formulation of the paint vehicle | |
|---|---|
| Water | 7.4 parts by weight |
| Ethylene glycol | 1.5 |
| 2-Methyl-2,4-pentanediol | 1.5 |
| 10% Sodium hexametaphosphate | 1.1 |
| Dispersant (10%) | 0.5 |
| Ammonia water | 0.1 |
| Polyoxyethylene nonylphenyl ether | 1.0 |
| Mold-proofing agent | 0.1 |
| Antifoamer | 0.2 |
| Methyl cellulose (2%) | 15.0 |
| Titanium oxide | 12.0 |
| Calcium carbonate | 24.0 |
| Clay | 10.0 |
| Mica | 2.0 |
| Emulsion (50%) | 24.0 (12.0 as solids) |
| Total | 100.4 parts by weight |
| PVC (pigment volume concentration) | 60% |

Using the above vehicle, a sand finish paint of the following formulation was prepared.

| Formulation of the sand finish paint | |
|---|---|
| Paint vehicle | 100 parts by weight |
| White marble (average diameter 1.5 mm) | 50 |
| White marble (average diameter 1 mm) | 50 |
| Total | 200 Parts by weight |

The sand finish paint was sprayed onto a flexible board by a spray gun having a spraying pneumatic pressure of 5 kg/cm² and an inside gun diameter of 6 mm to a wet amount of 100 g/cm² with the distance between the gun and the board maintained at about 50 cm. The coated paint was dried for 7 days, and the water resistance, alkali resistance, and weatherability of the resulting coated paint were measured by the following methods.

Water resistance

A test specimen was dipped in water for 4 days, and the hardness and the swelling of the coated surface were evaluated on a scale of 5 grades in which 5 represents the best state and 1 represents the worst state.

Alkali resistance

A test specimen was dipped for 4 days in a saturated aqueous solution of calcium hydroxide, and then the hardness and swelling of the coated surface were evaluated on a scale of 5 grades in which 5 represents the best state and 1 represents the worst state.

Weatherability

A test specimen was exposed to a weather-Ometer for 50 hours, and ΔE, crack and swelling of the coated surface were observed.

ΔE: color difference (NBS unit).

The results are shown in Table 3.

TABLE 3

| | | Referential Example 1 | Control 1* | Control 2** |
|---|---|---|---|---|
| Water resistance | Hardness | 4 | 3 | 3.5 |
| | Swelling | 5 | 4 | 4.5 |
| Alkali resistance | Hardness | 4 | 3 | 3.5 |
| | Swelling | 4.5 | 3.5 | 4 |
| Weatherability (resistance to soiling) | ΔE | 2.3 | 4.4 | 3.2 |
| | Crack | None | None | None |
| | Swelling | | | |
| Minimum film-forming temperature (°C.) | | 0 | 2 | 10 |

*Referential Example 1 was repeated except that commercially available ethylene/vinyl acetate copolymer emulsion having an ethylene content of 12% by weight was used as the starting aqueous emulsion.
**Referential Example 1 was repeated except that a commercially available styrene/butyl acrylate copolymer emulsion (styrene content 50% by weight) was used as the starting aqueous emulsion.

REFERENTIAL EXAMPLE 2

Paper was treated in the following manner using the aqueous emulsion of multicomponent synthetic resin obtained in Example 1.

Unbleached kraft pulp (20 g) was added to 980 g of water, and the mixture was stirred for 2 minutes. Then, a 5% aqueous solution of sodium hydroxide was added dropwise to adjust the pH of the slurry to 8-9. The aqueous emulsion of multicomponent synthetic resin (15 g) was added, and then the slurry was further stirred for 3 minutes. Then, 60 g of a 5% alum solution was gradually added as a precipitating agent, and the mixture was stirred for 8 minutes. Then, the slurry was formed into paper by a Tappit Machine, and air dried in an adhering condition in a vertical dryer. The paper was then passed twice through hot rolls at 120° C. and 6 kg/cm² to heat-treat it and obtain a modified sheet of paper.

As a control, a modified sheet of paper was obtained in the same way as in Referential Example 2 using the ethylene/vinyl acetate copolymer emulsion obtained in Comparative Example 3.

The properties of the modified papers are shown in Table 4.

The properties in Table 4 were measured by the following methods.

(a) Thickness

The thickness of the sample at five parts was measured by a micrometer, and the average of the thicknesses measured was defined as the thickness of the sample.

(b) Tensile strength

Measured in accordance with a testing method for the tensile strength of paper in JIS P-8113.

(c) Wet tensile strength

Measured in accordance with a testing method for the wet tensile strength of paper and paper boards stipulated in JIS P-8135.

(d) Bursting strength

Measured by a testing method for the bursting strength of paper and paper boards of JIS P-8112 by means of a Muellen bursting strength tester.

(e) Folding endurance

Measured by a testing method for the folding endurance of paper and paper boards by an MIT-type tester in accordance with JIS P-8115.

(f) Degree of size

Measured in accordance with the method stipulated in JIS P-8122.

TABLE 4

|  | Referential Example 2 | Control |
|---|---|---|
| Thickness (mm) | 0.15 | 0.14 |
| Degree of size (seconds) | 49.7 | 38.5 |
| Tensile strength (kg/15 mm) | 29.32 | 8.3 |
| Wet tensile strength (kg/15 mm) | 3.86 | 0.92 |
| Bursting strength (kg/cm$^2$) | 12.63 | 9.31 |
| Folding endurance (number) | 2805 | 2920 |

REFERENCE EXAMPLE 3

Preparation of emulsion A (the process of the invention):

A 1-liter stainless steel autoclave equipped with an anchor-type stirrer was charged with the following ingredients.

| Distilled water | 298 g |
|---|---|
| Styrene | 86 g |
| Emulgen 950 (*1) | 9.6 g |
| Emal 2F (*2) | 2.4 g |
| Sodium pyrophosphate | 2.0 g |
| Ammonium persulfate | 2.0 g |

Subsequently, the air inside the autoclave was replaced by nitrogen and ethylene. With stirring, the temperature of the inside of the autoclave was adjusted to 70° C., and the pressure of ethylene was raised to 45 kg/cm$^2$. In this state, the first-step polymerization was performed for 3.5 hours. Subsequently, 200 g of vinyl acetate was added over the course of 2 hours as a second-step polymerization. During this time, the pressure of ethylene was maintained at 45 kg/cm$^2$. Then, the supply of ethylene was stopped, and the polymerization was performed for 1.5 hours. During this time, the pressure of ethylene decreased from 45 kg/cm$^2$ to 38 kg/cm$^2$. Then, the autoclave was cooled, and the product was taken out. The resulting aqueous emulsion of multi-component synthetic resin was a blue white stable emulsion having an average particle diameter of less than 0.1 micron and a solids content of 50.39% by weight.

The solid portion of the emulsion consisted of 9.33% by weight of ethylene, 60.67% by weight of vinyl acetate, and 30.0% by weight of styrene, and had a logarithmic viscosity of 0.46.

Preparation of emulsion B (outside the scope of the invention):

The same 1-liter autoclave as used in the preparation of emulsion A above was charged with the following ingredients.

| Distilled water | 260 g |
|---|---|
| Emulgen 950 | 7.2 g |
| Emal 2F | 1.8 g |
| Sodium pyrophosphate | 1.2 g |
| Ammonium persulfate | 0.6 g |
| Hydroxyethyl cellulose | 27 g |

Subsequently, the air inside the autoclave was replaced by nitrogen and ethylene. With stirring, the temperature of the inside of the autoclave was raised to 70° C., and the pressure of ethylene was increased to 30 kg/cm$^2$. Then, 300 g of vinyl acetate was added over the course of 3 hours, and polymerized. After the addition, the supply of ethylene was stopped, and the polymerization was performed further for 2 hours. After the reaction, the autoclave was cooled, and the resulting emulsion was withdrawn.

The resulting emulsion had an average particle diameter of 0.53 micron and a solids content of 50.39% by weight. The solid portion of the emulsion consisted of 11.76% by weight of ethylene, and 88.24% by weight of vinyl acetate, and had a logarithmic viscosity of 0.396.

One hundred parts by weight of ordinary portland cement, 300 parts by weight of sand, 20 parts each of the emulsions A and B obtained, and a suitable amount of water were kneaded to form a cement composition. Test samples were produced from the cement composition.

The various tests shown in Table 5 were performed using the test samples which were aged in the dry state for 28 days, or those which were aged in water for 28 days. The results are shown in Table 5.

The method of preparing polymer cement mortars in Referential Example 3 and Control and the methods for testing them were in accordance with the physical testing methods for cement in JIS R-5201 and the testing method for cement water-proofing agents for building in accordance with JIS A-1404.

TABLE 5

| Emulsion used | | Referential Example 3 A | Control B |
|---|---|---|---|
| Mortar flow value (after 30 minutes) | | 155 | 130 |
| Tensile strength | dried | 36.6 | 29.6 |
| (kg/cm$^2$) | in water | 23.8 | 20.5 |
| Flexural strength | dried | 72.1 | 52.1 |
| (kg/cm$^2$) | in water | 46.8 | 29.8 |
| Compressive strength | dried | 172 | 168 |
| (kg/cm$^2$) | in water | 221 | 195 |
| Adhesion strength | dried | 26.2 | 19.5 |
| (kg/cm$^2$) (to ordinary cement mortar) | in water | 10.3 | 7.2 |
| Water absorption (%) | dried | 5.4 | 9.6 |
| Impact strength (cm) | dried | 175 | 120 |

TABLE 5-continued

| Emulsion used | | Referential Example 3 A | Control B |
| --- | --- | --- | --- |
| (break height) | | | |
| Abrasion resistance (mg) (Taber index) | dried | 163 | 235 |

REFERENTIAL EXAMPLE 4

Using each of the emulsion A obtained in Referential Example 3, and the ethylene/vinyl acetate copolymer emulsion (to be referred to as emulsion C) obtained in Comparative Example 7, adversely bonded assemblies were produced under the following bonding conditions by bonding a plywood sheet to a semihard polyvinyl chloride sheet, a plywood sheet to an aluminum foil, a semi-hard polyvinyl chloride sheet to a cloth (cotton poplin cloth), a Mylar (polyethylene terephthalate) film, to a cloth (cotton poplin cloth).

The substrates used were as follows:

Plywood sheet

A water-resistant plywood having a thickness of 5.5 mm and classified as class 1, grade 1 by Japan Association of Inspecting Plywood (JAS) was cut into a piece with a size of 5 cm×20 cm. The piece was brushed well to remove dirt and dust on its surface, and then allowed to stand for a day and a night in a constant-temperature chamber kept at 20° C. and a relative humidity of 60%.

Semihard polyvinyl chloride sheet

For bonding with the plywood, a rectangular piece having a width of 25 mm and a length of 20 cm was cut out from a sheet having a thickness of 0.05 mm. For bonding to a cloth, a piece having a size of 10 cm×20 cm was cut off from a sheet having a thickness of 0.05 mm.

Aluminum foil

For bonding to a plywood sheet, a rectangular piece having a width of 25 mm and a length of 20 cm was cut off from a foil having a thickness of 0.05 mm. For bonding to a cloth, a piece having a size of 10 cm×20 cm was cut off from a foil having a thickness of 0.05 mm.

Cloth

A piece having a size of 10 cm×20 cm was cut off.

Mylar

A piece having a size of 10 cm×20 cm was cut off from a film having a thickness of 0.1 mm.

Preparation of a bonded assembly of a plywood and a semihard polyvinyl chloride sheet or aluminum foil:

Each of the emulsions A and C, adjusted to a solids concentration of 50% by weight, was coated on the plywood using an applicator having a thickness of 0.15 mm and a width of 30 mm, and dried for 1 minute in a constant-temperature device at 80° C. Then, the semihard polyvinyl chloride sheet or aluminum foil was bonded to the plywood using a hand roller. The resulting assembly was allowed to stand in a constant temperature chamber kept at 20° C. and a humidity of 60% for 48 hours, and then its adhesion strength in a normal condition and in water, and heat resistance were measured. The results are shown in Table 6.

Preparation of a bonded assembly of the cloth and the semihard polyvinyl sheet or Myler film:

Each of the emulsions A and C, adjusted to a solids concentration of 50% by weight, was coated on each of the semihard polyvinyl chloride sheet and aluminum foil using an applicator having a thickness of 0.15 mm and a width of 60 cm. Immediately then, the cloth was superimposed on the coated layer, and bonded by a hand roller. The resulting assembly was allowed to stand for 48 hours in a constant temperature chamber kept at a temperature of 20° C. and a humidity of 60% to dry it, and then cut into a rectangular piece having a width of 25 mm. The adhesion strength of this sample in a normal condition is shown in Table 6.

The properties described above were measured by the following methods.

Adhesion strength in a normal condition

The bonded assembly was allowed to stand for 48 hours in a constant temperature chamber kept at a temperature of 20° C. and a humidity of 60%, and its adhesion strength was measured by means of a tensile tester (Toyo-Baldwin Tensilon UTM-III-100).

Adhesion strength in water

The bonded assembly was allowed to stand for 48 hours in a constant temperature chamber kept at a temperature of 20° C. and a humidity of 60%, and then dipped in water (20° C.) for 12 hours. Then, the adhesion strength of the bonded assembly was measured by using the same tensile tester as used in the measurement of the adhesion strength in a normal condition.

Heat resistance

The bonded assembly of plywood and semihard polyvinyl chloride sheet was used, and a part of the top and of the semihard polyvinyl chloride sheet was peeled off. A load of 500 g was exerted on its tip. The assembly was then heated in an air circulating oven at a rate of 1° C./minute from 40° C., and the temperature required for the top end of the polyvinyl chloride sheet to come off and creep along a length of 25 mm was measured. This temperature was defined as the heat-resistant temperature.

TABLE 6

| Type of the emulsion used | Referential Example 4 A | Control C |
| --- | --- | --- |
| Bonded assembly of plywood and semi-hard polyvinyl chloride sheet | | |
| Adhesion strength in a normal condition (kg/25 mm) | 4.5 | 3.0 |
| Adhesion strength in water (kg/25 mm) | 3.7 | 2.1 |
| Heat resistance (°C.) | 78 | 68 |
| Bonded assembly of plywood and aluminum foil | | |
| Adhesion strength in a normal condition (kg/25 mm) | 5.5 | 4.2 |
| Adhesion strength in water (kg/25 mm) | 4.7 | 1.3 |
| Bonded assembly of cloth and semi-hard polyvinyl chloride | | |
| Adhesion strength in a normal condition (kg/25 mm) | 1.2 | 0.6 |
| Bonded assembly of cloth and Myler film | | |
| Adhesion strength in a normal condition (kg/25 mm) | 0.9 | 0.4 |

REFERENTIAL EXAMPLE 5

Each of the emulsion A obtained in Referential Example 3 and the emulsion B described as a control in Referential Example 4 was coagulated, washed, and dried to form a solid multi-component synthetic resin. The synthetic resin (5% by weight) was mixed with 95% by weight of marketed straight asphalt (the degree of penetration 40 to 60) heated to 160° C., and the mixture was stirred. The time required for blending, the softening point, the degree of penetration, and elongation were measured, and the results are shown in Table 7.

TABLE 7

|  | Referential Example 5 | Control | |
| --- | --- | --- | --- |
| Type of emulsion used | A | — | B |
| Time required for blending (minutes) (*1) | 5 | — | 10 |
| Degree of penetration (25° C.) (*2) | 53 | 55 | 57 |
| Softening point (°C.) (*3) | 54 | 50 | 49 |
| Elongation (cm) (15° C.) (*4) | 95 | 60 | 64 |

(*1): Using a 500 ml beaker; stirring speed 200 rpm; asphalt temperature 160° C.
(*2): In accordance with JIS K 2530-60. 25° C., 100 g, 5 sec.
(*3): In accordance with JIS K 2531-60.
(*4): In accordance with JIS K 2533-71. 15° C., 5 cm/min.

What is claimed is:

1. An aqueous emulsion of a multicomponent synthetic resin containing 10 to 60% by weight of solids resulting from the polymerization of
   (A) 1 to 50% by weight of ethylene,
   (B) 4 to 95% by weight of a styrene monomer or a mixture of a styrene monomer and a monomer copolymerizable therewith, and
   (C) 4 to 95% by weight of a vinyl ester or a mixture of a vinyl ester and a monomer copolymerizable therewith, said emulsion being obtained by emulsion-polymerization of ethylene and component (C) in the presence of an aqueous emulsion obtained by the emulsion-polymerization of ethylene and component (B).

2. A process for producing an aqueous emulsion of a multicomponent synthetic resin containing 10 to 60% by weight of solids resulting from the polymerization of
   (A) 1 to 50% by weight of ethylene,
   (B) 4 to 95% by weight of a styrene monomer or a mixture of a styrene monomer and a monomer copolymerizable therewith, and
   (C) 4 to 95% by weight of a vinyl ester or a mixture of a vinyl ester and a monomer copolymerizable therewith, which comprises a first step of emulsion-polymerizing ethylene and component (B) to form an aqueous emulsion substantially free from monomer (B), and a second step of emulsion polymerizing ethylene and component (C) in the presence of the aqueous emulsion obtained in the first step.

3. The process of claim 2 wherein said styrene monomer is selected from the group consisting of styrene, alpha-methylstyrene, 2-chlorostyrene, 4-chlorostyrene, 2,5-dichlorostyrene and 4-methoxystyrene, and said monomer copolymerizable with the styrene monomer is selected from the group consisting of methyl (meth)acrylates, ethyl (meth)acrylates, propyl (meth)acrylates, butyl (meth)acrylates, 2-ethylhexyl (meth)acrylates, acrylic acid, methacrylic acid, maleic acid, maleic acid esters, (meth)acrylonitriles, (meth)acrylamides, vinylpyridine and vinylpyrrolidone.

4. The process of claim 2 wherein said vinyl ester is selected from vinyl esters of linear or branched carboxylic acids containing 1 to 25 carbon atoms, and said monomer copolymerizable with the vinyl ester is selected from the group consisting of vinyl chloride, vinyl bromide, acrylate esters, crotonic acid, and fumaric acid esters.

5. The process of claim 2 wherein the weight ratio of the styrene monomer to the monomer copolymerizable therewith in component (B) is from 1:0 to 1:3, and the weight ratio of the vinyl ester to the monomer copolymerizable therewith in component (C) is from 1:0 to 1:3.

6. The process of claim 2 wherein said styrene monomer in component (B) is styrene, and said vinyl ester in component (C) is vinyl acetate.

7. The process of claim 2 wherein the emulsion polymerization in the first step is carried out until the amount of the unreacted monomer (B) in the resulting aqueous emulsion is less than about 300 ppm.

8. The process of claim 2 wherein the emulsion polymerization in the first and second steps is carried out in the presence of a radical-forming catalyst at a temperature of 0° to 100° C. and a pressure of 5 to 200 kg/cm$^2$.

* * * * *